United States Patent [19]
Kang et al.

[11] Patent Number: 5,562,754
[45] Date of Patent: Oct. 8, 1996

[54] PRODUCTION OF OXYGEN BY ION TRANSPORT MEMBRANES WITH STEAM UTILIZATION

[75] Inventors: Doohee Kang, Macungie; Steven L. Russek, Allentown; Rakesh Agrawal, Emmaus; David D. Brengel, Schnecksville; Edward P. Foster, Wescosville, all of Pa.

[73] Assignee: Air Products and Chemicals, Inc., Allentown, Pa.

[21] Appl. No.: 488,229

[22] Filed: Jun. 7, 1995

[51] Int. Cl.[6] .................................................. B01D 53/22
[52] U.S. Cl. ................................................. 95/54; 95/288
[58] Field of Search ................................... 95/45, 47–56, 95/288

[56] References Cited

U.S. PATENT DOCUMENTS

| | | | |
|---|---|---|---|
| Re. 34,595 | 5/1994 | Chen et al. ................................... | 95/54 |
| 4,545,787 | 10/1985 | Hegarty ........................................ | 55/16 |
| 4,560,394 | 12/1985 | McDonald et al. ........................... | 95/54 |
| 4,817,392 | 4/1989 | Agrawal et al. ......................... | 95/54 X |
| 5,035,726 | 7/1991 | Chen et al. ................................... | 95/54 |
| 5,035,727 | 7/1991 | Chen ............................................ | 55/16 |
| 5,049,174 | 9/1991 | Thorogood et al. ..................... | 95/54 X |
| 5,108,465 | 4/1992 | Bauer et al. ................................. | 95/54 |
| 5,118,395 | 6/1992 | Chen et al. ................................... | 204/59 |
| 5,160,618 | 11/1992 | Burggraaf et al. ....................... | 210/490 |
| 5,169,415 | 12/1992 | Raettger et al. ............................ | 95/54 |
| 5,174,866 | 12/1992 | Chen et al. ................................... | 204/59 |
| 5,240,480 | 8/1993 | Thorogood et al. ..................... | 95/54 X |
| 5,245,110 | 9/1993 | Van Dijk et al. ......................... | 585/946 |
| 5,435,836 | 7/1995 | Anand et al. ................................ | 95/45 |
| 5,447,555 | 9/1995 | Yee et al. ..................................... | 95/54 |

OTHER PUBLICATIONS

Wright, J. D., Copeland, R. J., "Advanced Oxygen Separation Membranes", Report No. TDA–GRI–90/0303, prepared for the Gas Research Institute, Sep. 1990.

Clark, D. J. et al, "Separation of Oxygen by Using Zirconia Solid Electrolyte Membranes" in *Gas Seperation and Purification* 1992, vol. 6, No. 4, pp. 201–205.

Dharmadhikari, S., "Understanding Gas Turbine Cycles" in *The Chemical Engineer*, 28 Jan. 1993, pp. 17–20.

*Primary Examiner*—Robert Spitzer
*Attorney, Agent, or Firm*—John M. Fernbacher

[57] ABSTRACT

Oxygen is recovered from a heated, compressed, oxygen-containing feed gas by selective permeation of oxygen through an ion transport membrane separation system and the hot, pressurized non-permeate gas is passed through an expansion turbine to recover power for compressing the feed gas and optionally generating electric power. Membrane performance and process heat recovery are enhanced by the addition of water to selected process streams. Steam raised by process heat is used to sweep the permeate side of the membrane to increase the oxygen permeation rate. The injection of partially or fully vaporized water into the expansion turbine inlet gas recovers process heat and increases mass flow to the turbine.

22 Claims, 3 Drawing Sheets

PRODUCTION OF OXYGEN BY ION TRANSPORT MEMBRANES WITH STEAM UTILIZATION

FIELD OF THE INVENTION

The invention pertains to the recovery of oxygen by high temperature ion transport membranes, and in particular to the introduction of water into processes using such membranes to improve oxygen recovery and heat utilization.

BACKGROUND OF THE INVENTION

Oxygen is an economically important gas which is widely used in large-scale industrial applications. New uses for oxygen are emerging in advanced high-temperature processes for iron and steel manufacture, coal gasification, oxygen-enriched combustion, and in particular integrated gasification combined cycle power generation. In these large-scale applications, the cost of oxygen produced by conventional cryogenic or noncryogenic technology is a major portion of the overall operating cost, and lower oxygen cost will encourage the commercialization of these emerging technologies. New oxygen separation processes which can be themally integrated with these advanced high-temperature processes will reduce the energy consumed in oxygen production, which in turn will promote the technical and commercial development of such integrated systems.

Oxygen can be recovered from air at high temperatures by inorganic oxide ceramic materials utilized in the form of selectively permeable non-porous ion transport membranes. An oxygen partial pressure differential or a voltage differential across the membrane causes oxygen ions to migrate through the membrane from the feed side to the permeate side where the ions recombine to form electrons and oxygen gas. An ion transport membrane of the pressure-driven type is defined herein as a mixed conductor membrane, in which the electrons simultaneously migrate through the membrane to preserve internal electrical neutrality. An ion transport membrane of the electrically-driven type is defined herein as a solid electrolyte membrane in which the electrons flow from the permeate side to the feed side of the membrane in an external circuit driven by a voltage differential. A comprehensive review of the characteristics and applications of such membranes is given in a report entitled "Advanced Oxygen Separation Membranes" by J. D. Wright and R. J. Copeland, Report No. TDA-GRI-90/0303 prepared for the Gas Research Institute, September 1990.

In the recovery of oxygen from air at high temperatures (typically 700° C. to 1100° C.) using ion transport membranes, a significant amount of heat energy is available in the membrane permeate and non-permeate streams. The effective use of this energy in the overall operation of a mixed conductor membrane system is necessary if the system is to be competitive with conventional cryogenic technology for large scale oxygen production. Energy recovery and effective utilization thereof is possible by the integration of compressors, combustors, hot gas turbines, steam turbines, and heat exchangers with the mixed conductor membrane module. U.S. Pat. No. 4,545,787 discloses the production of oxygen and net power in the integrated operation of a mixed conductor ceramic membrane. Air is compressed, heated, and passed through a membrane separator to produce an oxygen permeate and an oxygen-containing non-permeate stream. The non-permeate stream is combusted with a fuel and the hot combustion gases are expanded in a hot gas turbine. The turbine provides shaft power for the compressor and drives a generator for export of electricity, and turbine exhaust is optionally used to cogenerate steam or to preheat the compressed air membrane feed. Alternately, the membrane is placed downstream of the combustion step.

U.S. Pat. No. 5,035,727 describes the recovery of oxygen by a solid electrolyte membrane in conjunction with an externally-fired gas turbine in which compressed air is heated indirectly and passed through the membrane module. Non-permeate gas is expanded through a hot gas turbine, the turbine exhaust is heated by direct combustion, and the combustion products provide heat indirectly to the membrane feed. Steam is recovered from the waste heat after heat exchange with the membrane feed.

U.S. Pat. No. 5,118,395 describes the recovery of oxygen from gas turbine exhaust utilizing a solid electrolyte membrane with the coproduction of electric power and steam. A supplemental burner heats the turbine exhaust prior to the membrane, and steam is generated by the membrane non-permeate stream. Related U.S. Pat. No. 5,174,866 discloses a similar system in which intermediate turbine exhaust is passed through the membrane and the membrane non-permeate stream is further expanded through another turbine stage. In both patents, turbine shaft power is used to drive the air compressor and an electric generator.

The report by J. D. Wright and R. J. Copeland identified above discloses at p. 55 a gas turbine-driven ceramic membrane system in which air is compressed, heated indirectly in a fired heater, and passed through the membrane to yield oxygen and non-permeate gas. The non-permeate gas is combusted with natural gas in the fired heater and the combustion products are expanded through a hot gas turbine to drive the compressor and generate electric power. Heating of the air feed to the membrane and the combustion of fuel and non-permeate gas prior to the turbine thus are accomplished in a single integrated combustion chamber.

U.S. Pat. No. 5,245,110 (equivalent to PCT International Publication No. WO 93/06041) discloses the integration of a gas turbine with an oxygen-selective membrane system. The permeate side of the membrane is swept with air to yield an enriched air product containing about 35 vol % oxygen. The enriched air product is used in a hydrocarbon reformer or gasifier process, and tail gas from the reformer or gasifier is introduced into the gas turbine combustor to balance the flow of hot gas to the turbine. The nitrogen from the permeate and membrane sweep air replaces the mass lost when oxygen is consumed in the reformer or gasifier process, which maintains the turbine in a desired mass and thermal balance.

An article entitled "Separation of Oxygen by Using Zirconia Solid Electrolyte Membranes" by D. J. Clark et al in *Gas Separation and Purification* 1992, Vol. 6, No. 4, pp. 201–205 discloses an integrated coal gasification-gas turbine cogeneration system with recovery of oxygen for use in the gasifier. Membrane non-permeate is combusted with gas from the gasifier and passed to the gas turbine cogeneration system.

A combined cycle power generation system is a highly efficient system which utilizes a gas turbine to drive an electric generator, wherein heat is recovered from the turbine exhaust as steam which drives an additional electric generator. A description of typical combined cycle power generation systems is given in *The Chemical Engineer*, 28 Jan. 1993, pp. 17–20. The compressor, combustor, and expansion turbine are carefully designed and integrated to maximize the efficiency of each component and thus the efficiency of the integrated system. Preferably these systems are operated at steady-state design conditions, since significant deviations from these conditions will adversely affect system efficiency.

The successful development and commercialization of oxygen production by ion transport membranes will require flexible systems which maximize energy utilization and allow operation of system components at optimum conditions. In many situations, the recovery of oxygen and excess energy from an ion transport membrane system must be maximized in order to minimize operating costs. In other situations, low capital cost will be of primary importance and operating cost of less importance. The invention disclosed below and described in the following claims addresses these latter situations with a method for producing oxygen by an ion transport membrane system in which water is introduced into the system to improve oxygen recovery and heat utilization.

SUMMARY OF THE INVENTION

The present invention is a method for the recovery of oxygen from an oxygen-containing gas by compressing and heating a stream of oxygen-containing gas to yield a hot pressurized feed, and passing the hot pressurized feed into a membrane separation zone comprising one or more oxygen-selective ion transport membranes which divide the zone into a feed side and a permeate side. The hot pressurized feed flows through the feed side, oxygen permeate gas is produced in the permeate side, and a hot oxygen-depleted non-permeate gas is withdrawn from the feed side of the membrane zone. Water is introduced into the hot oxygen-depleted non-permeate gas, and the resulting water-containing oxygen-depleted non-permeate gas is passed through an expansion turbine to generate shaft power. Exhaust gas is withdrawn from the expansion turbine.

Preferably the oxygen-containing feed gas is air, and typically the oxygen permeate product is high purity oxygen containing at least 98 vol % oxygen. Water can be introduced as a liquid, a vapor, or a mixture of liquid and vapor. At least a portion of the water can be preheated by indirect heat exchange with the hot oxygen permeate product. Optionally at least a portion of the water is preheated by indirect heat exchange with the exhaust gas from the expansion turbine.

The oxygen-containing gas is heated following compression by combusting the gas with a fuel in a direct-fired combustor to produce a hot, oxygen-containing combustion product which provides the hot pressurized feed. In an alternative mode, the oxygen-containing gas is heated following compression by indirect heat exchange with a hot combustion product which is obtained by combusting the hot oxygen-depleted non-permeate gas with a fuel in a direct-fired combustor. Water can be introduced into the hot combustion product prior to indirect heat exchange. Shaft power of the expansion turbine optionally is used at least in part to drive an electric power generator. Optionally, a sweep gas which does not react with oxygen at the membrane operating conditions is used to sweep the permeate side of the membrane separation zone and a mixture comprising sweep gas and hot oxygen permeate product is withdrawn therefrom. Preferably the sweep gas is steam.

In an alternative embodiment, the invention is a method for the recovery of oxygen from an oxygen-containing gas which comprises compressing and heating a stream of said oxygen-containing gas to yield a hot pressurized feed, passing the hot pressurized feed into a membrane separation zone comprising one or more oxygen-selective ion transport membranes which divide the zone into a feed side and a permeate side, wherein the hot pressurized feed flows through the feed side and oxygen permeate gas is produced in the permeate side, and withdrawing from the feed side of the membrane separation zone a hot oxygen-depleted non-permeate gas. A sweep gas which does not react with oxygen at the membrane operating conditions is used to sweep the permeate side of the membrane separation zone and a mixture comprising sweep gas and hot oxygen permeate product is withdrawn therefrom. Preferably the sweep gas is steam. The hot oxygen-depleted non-permeate gas is passed through an expansion turbine to generate shaft power, and exhaust gas is withdrawn therefrom. Preferably the oxygen-containing gas is air, and the oxygen permeate product is a mixture of sweep gas (preferably steam) and oxygen containing at least 25 vol % oxygen. The oxygen-containing gas is heated following compression by combusting the gas with a fuel in a direct-fired combustor to produce a hot, oxygen-containing combustion product which provides the hot pressurized feed. Steam for sweep is obtained by heating water by indirect heat exchange with the hot, oxygen-containing combustion product within the direct-fired combustor. The water for producing steam is preheated by indirect heat exchange with one or more process streams selected from the group consisting of the mixture comprising steam and oxygen permeate gas after withdrawal from the membrane separation zone, the hot oxygen-depleted non-permeate gas, and the exhaust gas from the expansion turbine. Optionally, water is introduced into the hot oxygen-depleted non-permeate gas prior to the expansion turbine. The shaft power of the expansion turbine optionally is used at least in part to drive an electric power generator.

DETAILED DESCRIPTION OF THE INVENTION

The present invention utilizes a solid ceramic ion transport membrane integrated with compression, heating, and energy recovery steps to produce oxygen or an oxygen-steam mixture from an oxygen-containing gas, preferably air. The membrane operates by a mechanism in which an oxygen partial pressure differential or a voltage differential across the membrane causes oxygen ions to migrate through the membrane from the feed side to the permeate side where the oxygen ions recombine to form oxygen gas and free electrons. An ion transport membrane of the pressure-driven type is defined herein as a mixed conductor membrane, in which the electrons simultaneously migrate through the membrane to preserve internal electrical neutrality. The term pressure-driven means that oxygen ions move through the membrane in the direction of decreasing partial pressure. An ion transport membrane of the electrically-driven type is defined herein as a solid electrolyte membrane, in which the electrons flow from the permeate side to the feed side of the membrane in an external circuit driven by a voltage differential. A mechanically perfect membrane of either type operating without gas leakage is infinitely selective for oxygen; in practical applications a high-purity oxygen product containing at least 98 vol % oxygen is achievable.

The key feature of the invention as described herein is the selective introduction of water into the system to improve energy efficiency, reduce equipment requirements, and improve the performance of the ion transport membrane.

Figure 1:
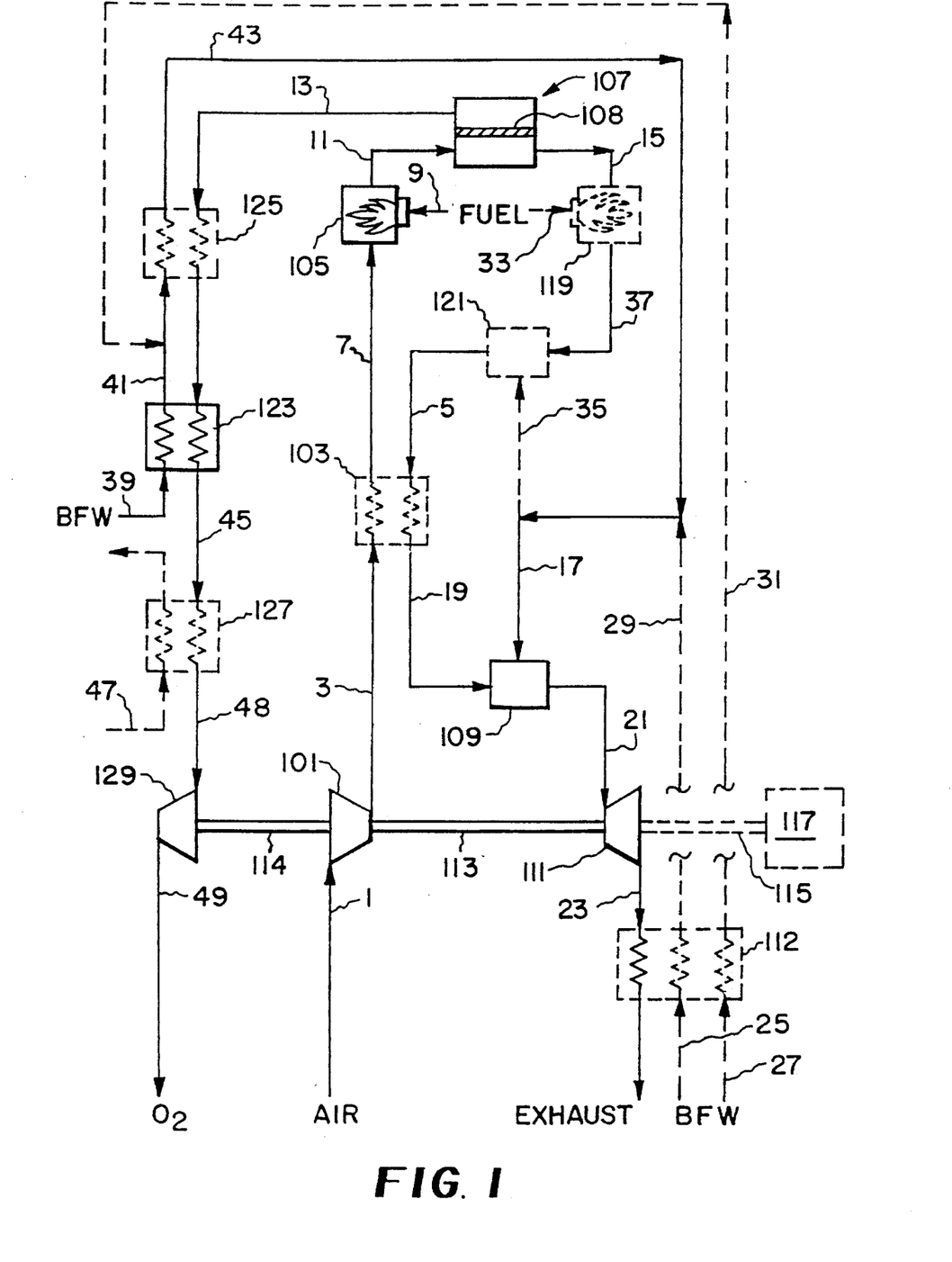
FIG. 1 is a schematic flowsheet of an embodiment of the present invention.

A first embodiment of the invention is given in FIG. 1. Oxygen-containing gas 1, preferably air, is compressed in compressor 101 to a pressure between 50 and 500 psia, preferably 80 to 300 psia. Compressor 101 is a centrifugal, axial, screw, or reciprocating compressor, optionally multistaged, and optionally intercooled. When operating without intercooling in an adiabatic mode, compressed feed 3 will be at a temperature of 360° to 1,100° F.; when operated with intercooling in an isothermal mode, compressed feed 3 will be at 150° to 300° F. Compressed feed is optionally preheated in heat exchange zone 103 by indirect heat exchange with hot process stream 5 (later defined) and heated stream 7 passes into direct-fired combustor 105, which is preferably gas-fired and utilizes fuel gas 9 which is natural gas, synthesis gas comprising hydrogen and carbon monoxide, refinery fuel gas containing mixed hydrocarbons, or another combustible gas mixture. Combustor 105 may be of the type known and used in the gas turbine art, or any other type of combustor, provided that gaseous fuel can be combusted with excess air to yield an acceptable feed for membrane separation zone 107 described below.

Combustor 105 is operated with sufficient excess air such that hot combustion stream 11 contains about 10–20 vol % oxygen at a temperature of 800° to 2,000° F., preferably 1,000° to 1,600° F. Stream 11 passes through the feed side of membrane separation zone 107 comprising membrane 108, preferably a mixed conductor membrane, wherein oxygen diffuses through the membrane driven by an oxygen partial pressure differential in the range of 2 to 80 psi, and hot high purity oxygen stream 13 typically containing at least 98 vol % oxygen is withdrawn therefrom at 2 to 30 psia. Hot non-permeate stream 15 is withdrawn at near feed pressure and contains 6 to 18 vol % oxygen. Membrane 108 operates in the temperature range of 800° to 2,000° F., preferably 1,000° to 1,600° F. Membrane separation zone 107 typically is sized and operated such that up to about 90% of the oxygen in membrane feed 11 is recovered as product 13.

Alternatively, ion transport membrane 108 can be of the solid electrolyte type as described earlier which is driven by a voltage differential across the membrane in which electrons are conducted through an external circuit with porous electrodes attached to the surfaces of the membrane. In this mode of operation the oxygen permeate product can be recovered at or above the feed pressure.

Ion transport membrane 108 is typically a solid ceramic assembly in the form of tubes, sheets, or a monolithic honeycomb. The membrane divides membrane separation zone 107 into a feed side and a permeate side. Typical compositions of the active membrane material are given in representative articles by Y. Teraoka et al in *Chemistry Letters*, 1985, pp.1743–1746 and by H. Iwahara et al in *Advances in Ceramics*, Vol. 24: Science and Technology of Zirconia III, pp. 907–914, or in the article by J. D. Wright and R. J. Copeland earlier cited.

Any solid ceramic membrane material which selectively permeates oxygen in the form of oxygen ions, of either the mixed conductor or solid electrolyte type described above, can be utilized in the present invention. Preferred membranes of the mixed conductor type are described in U.S. Pat. No. 5,240,480, which is incorporated herein by reference. This patent discloses a membrane which comprises a porous layer with an average pore radius of less than 10 microns upon which is deposited a nonporous dense layer, in which both the porous substrate and the nonporous dense layer comprise multicomponent metallic oxides capable of conducting electrons and oxygen ions. This composite membrane operates at temperatures above 500° C. and recovers high purity oxygen by the mechanism discussed earlier. Representative membranes are described in which the porous layer and/or the dense layer are formed from a multicomponent metallic oxide selected from the group consisting of $La_{0.2}Ba_{0.8}Co_{0.8}Fe_{0.2}O_{3-x}$, $Pr_{0.2}Ba_{0.8}Co_{0.8}Fe_{0.2}O_{3-x}$, and $La_{0.2}Ba_{0.8}Co_{0.6}Cu_{0.2}Fe_{0.2}O_{3-x}$ where x is between 0 and 1.

Preferred membranes of the solid electrolyte type can be fabricated by depositing a thin layer of multicomponent oxide on a porous substrate as described in U.S. Pat. No. 5,160,618, which is incorporated herein by reference. A preferred membrane comprises yttria-stabilized zirconia which has been deposited into the micropores of a lanthanum-doped alumina surface layer of a porous alumina substrate having an average pore diameter of less than about 50 nanometers and on the surface layer of the alumina substrate wherein the thickness of the yttria-stabilized zirconia is 0.5 microns or less. The yttria-stabilized zirconia layer is deposited at a temperature of 700°–1100° C. at a pressure of 1 to 760 torr over a time period ranging from 1 to 120 minutes by the following method. At least two metal halides, for example yttrium chloride and zirconium chloride, are vaporized on one side of the substrate described above and an oxidizing gas such as a mixture of oxygen and water is contacted with the other side of the substrate. The two gas mixtures diffuse and react within the pores of the porous surface layer to deposit the corresponding metal oxides therein, forming the membrane capable of separating an oxygen-containing gas mixture by the mechanism described earlier. This thin coating of active membrane material can be deposited on tubes, sheets, or monolithic honeycomb before or after assembly in a membrane module.

Referring again to FIG. 1, hot non-permeate 15, now containing 6 to 8 vol % oxygen, optionally passes as hot process stream 5 through heat exchange zone 103 to preheat compressed feed 3. Water 17, which can be a liquid, vapor, or a mixture of liquid and vapor, is introduced into non-permeate stream 19 in water introduction zone 109. In this specification, the term water generically defines the compound $H_2O$ in any phase or coexisting phases. If water 17 is vapor (i.e. steam), water introduction zone 109 is a simple gas mixing zone. If water 17 contains liquid, water introduction zone 109 is a direct-contact vaporizer designed to eliminate liquid droplets which could impinge on downstream equipment before completely vaporizing. The combined stream 21 in which all water is present as vapor typically at 1000° to 1400° F. is passed through hot gas expansion turbine 111 to generate shaft power, and exhaust 23 is withdrawn therefrom at 200° to 800° F. and a pressure up to 20 psia. Expansion turbine 111 is of the type typically used for hot gas mixtures containing water vapor, for example such as turbines manufactured by Dresser-Rand Corporation for use in the nitric acid industry. Preferably, turbine 111 can be mechanically linked with compressor 101 by shaft 113 whereby the required compression power is supplied by turbine 111. Optionally, a portion of the shaft power of turbine 111 via shaft 115 is used to produce electricity in generator 117. Optionally, turbine exhaust 23 is utilized to preheat boiler feed water 25 and/or 27 in heat exchange zone 112 to obtain preheated water 29 and/or 31 as liquid, vapor, or a mixture of liquid and vapor. The term boiler feed water as used in this specification defines water which has been treated by means known in the art for use in generating steam for steam turbines and other applications requiring high purity steam. Boiler feed water is typically produced by demineralization and ion exchange of ordinary utility water from wells or surface sources. Preheated water 29 optionally provides at least a portion of water 17 which is used as earlier described.

Optionally and preferably, oxygen permeate 45 is further cooled against coolant stream 47 in heat exchange zone 127 and withdrawn through oxygen blower 129 to provide final oxygen product 49 at or above atmospheric pressure. In this preferred option, the permeate side of membrane separation zone 107 operates at a pressure in the range of 2 to 30 psia which increases the oxygen partial pressure driving force across membrane 108 and in turn reduces the membrane area required for a given oxygen production rate. Blower 129 optionally is driven via shaft 114 using a portion of the work recovered in expansion turbine 111.

In an alternative mode of operation described in FIG. 1, compressed feed 3 is heated entirely by indirect heat exchange with hot process stream 5 in heat exchange zone 103, wherein hot process stream 5 is provided by combusting hot non-permeate stream 15 with fuel 33 in combustor 119. Combustor 105 is not used in this alternative mode, so that heated feed 11 to membrane separation zone 107 contains no combustion products. Water 35 is introduced into non-permeate combustion product stream 37 in water introduction zone 121. If water 35 is vapor (i.e. steam), water introduction zone 121 is a simple gas mixing zone. If water 35 contains liquid, water introduction zone 121 is a direct-contact vaporizer designed to eliminate liquid droplets which could impinge on downstream equipment before completely vaporizing. The combined stream 5 passes through heat exchange zone 103 and passes through hot gas expansion turbine 111 to generate shaft power, and exhaust 23 is withdrawn therefrom at a pressure up to 20 psia. Optionally water 17 is introduced into non-permeate 19 via water introduction zone 109 rather than as water 35 into zone 121.

Preheating of water 17 or 35 prior to introduction into the non-permeate stream can be accomplished by several alternative methods. A preferred method is to preheat boiler feed water 39 against hot high purity oxygen stream 13 in heat exchange zone 123. Heated water 41 provides at least a portion of water 17 or water 35 for introduction into the non-permeate stream prior to expansion turbine 111. Optionally, preheated water 29 is combined with preheated water 41 to provide preheated water 17 or 35. In another optional mode, preheated water 31 is combined with preheated water 41 and the combined stream is further heated against hot oxygen permeate 13 in heat exchange zone 125 to yield heated water 43 for use as earlier described.

The essential feature of the invention illustrated in the embodiment of FIG. 1 is the addition of water 17 or 35 to hot non-permeate stream 15 or 37 and the introduction of the resulting water vapor-containing stream into expansion turbine 111. This feature allows the cooling of expansion turbine 111 inlet stream 21 which in turn allows the use of a less complex turbine which operates at lower temperatures than a typical gas turbine. In the present invention, expansion turbine 111 operates at 700° to 1500° F., preferably 1000° to 1400° F.; a conventional gas turbine by comparison operates at 1600° to 2800° F.

Figure 2:
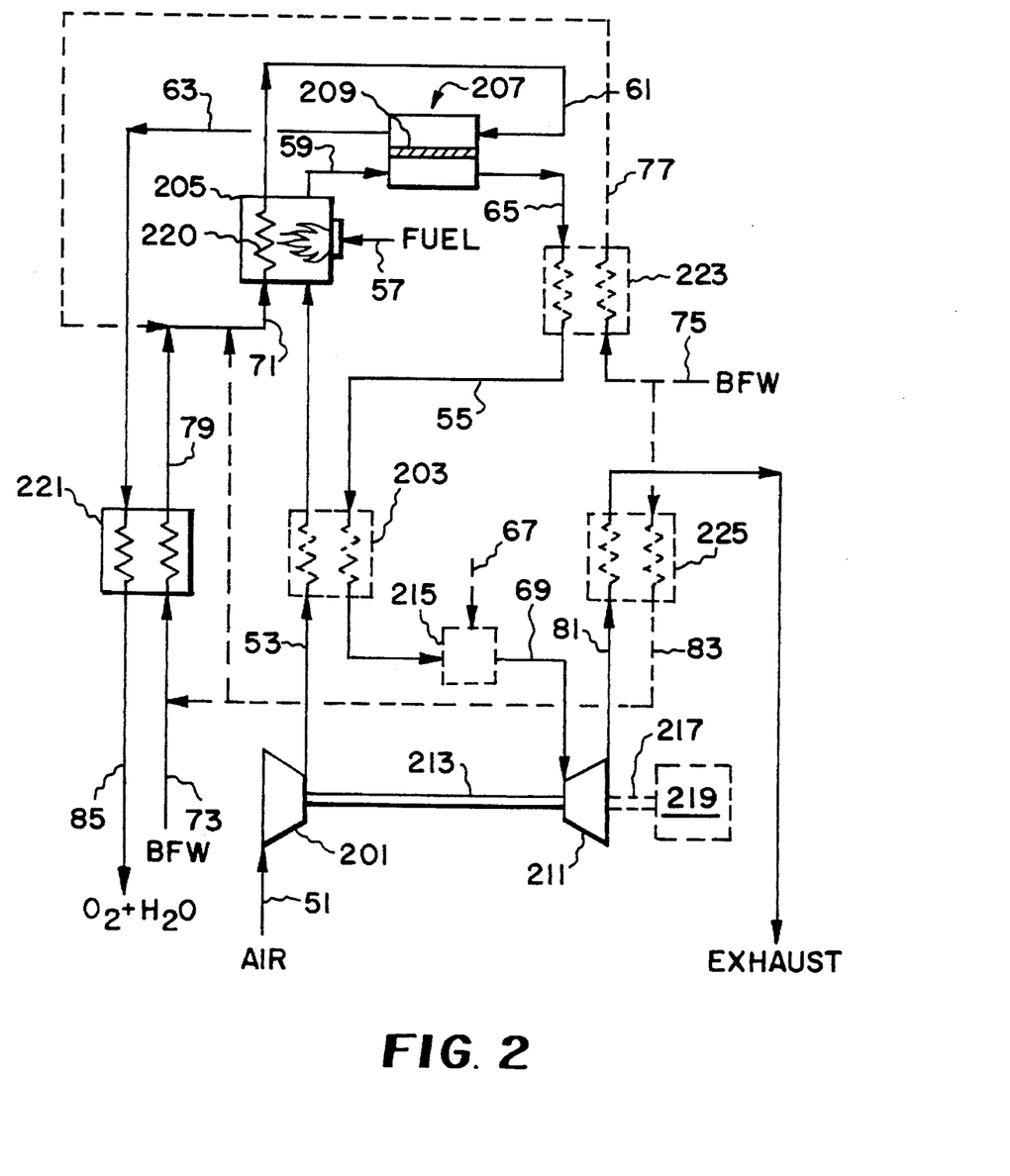
FIG. 2 is a schematic flowsheet of an alternative embodiment of the present invention.

An alternative embodiment of the invention is illustrated in FIG. 2 in which oxygen-containing gas 51, preferably air, is compressed in compressor 201 to a pressure between 50 and 500 psia, preferably 80 to 300 psia. Compressor 201 is a centrifugal, axial, screw, or reciprocating compressor which is preferably operated with intercooling in an isothermal mode to yield compressed gas stream 53 at 150° to 300° F. Alternatively, the compressor can be operated in an adiabatic mode to yield compressed and heated gas stream 53 at a temperature of 360° F. to 1,100° F. Stream 53 optionally is preheated in heat exchange zone 203 by indirect heat exchange with hot process stream 55 (later defined) and passes into direct-fired combustor 205, which is preferably gas-fired, and utilizes fuel gas 57 selected from natural gas, synthesis gas comprising hydrogen and carbon monoxide, refinery fuel gas containing mixed hydrocarbons, or another combustible gas mixture. Combustor 205 is operated with sufficient excess air such that hot combustion product 59 contains about 10–20 vol % oxygen at a temperature of 800° to 2,000° F., preferably 1,000° to 1,600° F. Stream 59 passes through the feed side of membrane separation zone 207 comprising membrane 209, preferably a mixed conductor membrane, wherein oxygen diffuses through the membrane driven by an oxygen partial pressure differential in the range of 1 to 100 psi. Alternatively, ion transport membrane 209 can be of the solid electrolyte type as earlier described; in this mode of operation the oxygen permeate product can be recovered at or above the feed pressure. Ion transport membrane separation zone 207 typically comprises a solid ceramic assembly in the form of tubes, sheets, or a monolithic honeycomb as earlier described. The membrane divides membrane separation zone 207 into a feed side and a permeate side. Typical compositions of the active membrane material and preferred membranes are given above in the description of the previous embodiment.

Sweep gas 61 at 800° to 2000° F. and 2 to 300 psia is introduced to sweep the permeate side of membrane zone 207, preferably in a countercurrent mode, and membrane zone product stream 63 comprising oxygen and sweep gas is withdrawn therefrom. The use of sweep increases the oxygen partial pressure driving force across membrane 209. Hot membrane zone product stream 63 typically contains at least 5 mol % oxygen. Any sweep gas which does not react with oxygen at the membrane operating conditions can be used to sweep the permeate side of the membrane separation zone; steam is the preferred sweep gas 61. When steam is used for sweep, hot membrane zone product stream 63 optionally is withdrawn as a hot steam-oxygen product for direct use, for example in the gasification of heavy hydrocarbons or coal.

Hot non-permeate stream 65 is withdrawn at near feed pressure and contains 6 to 18 vol % oxygen. Membrane 209 operates in the temperature range of 800° to 2,000° F., preferably 1,000° to 1,600° F. Membrane separation zone 207 typically is sized and operated such that up to about 90% of the oxygen in membrane feed hot combustion product 59 is recovered in membrane zone product stream 63.

Hot non-permeate stream 65 is expanded through expansion turbine 211 to generate shaft power, at least a portion of which can be used via shaft 213 to drive compressor 201. Optionally, a portion of the expansion turbine 211 shaft power is utilized via shaft 217 to drive electric generator 219. Optionally, water 67 is introduced into hot non-permeate stream 65 in water introduction zone 215 and the combined stream 69 is expanded through expansion turbine 211. If water 67 is vapor (i.e. steam), water introduction zone 215 is a simple gas mixing zone. If water 67 contains liquid, water introduction zone 215 is a direct-contact vaporizer designed to eliminate liquid droplets which could impinge on downstream equipment before completely vaporizing. Water 67 can be preheated by available process heat in any of the optional methods discussed earlier in connection with the mode of FIG. 1. Optionally, some or all of water 67 can be supplied as a portion of sweep steam 61 (not shown).

Sweep steam 61 is generated from preheated boiler feed water 71 by heating in heat exchange zone 220 by indirect heat transfer against combustion products within combustor 205. Combustor 205 is a gas-fired steam boiler in which the combustion products 59 provide feed to membrane separation zone 207, and heat exchange zone 220 is a vaporizer/steam superheater within the combustor.

Sweep steam 61 typically is provided at the operating temperature of membrane separation zone 207 at a pressure of 2–300 psia. Preheated boiler feed water 71 can be provided by one or more methods which utilize available process heat, and a preferred method is to heat this feed water against hot oxygen permeate 63 in heat exchange zone 221. Optionally, additional preheat is achieved by heating a portion of boiler feed water 75 against hot non-permeate stream 65 in heat exchange zone 223 to yield preheated water 77 which is combined with preheated water 79 to yield heated water 71. Optionally, another portion of boiler feed water 75 is preheated against expansion turbine exhaust 81 in heat exchange zone 225 to yield preheated water 83 which is combined with boiler feed water 73 and/or 79 to yield heated water 71. Preheated water streams 77, 79, and 83 may be liquid, vapor, or a mixture of liquid and vapor depending on the relative process stream flow rates in the respective heat exchange zones. All remaining liquid water if present in heated water 71 is completely vaporized and superheated in heat exchange zone 220 to yield sweep steam 61. Alternatively, sweep steam 61 can be generated by heating preheated water 71 in a separate fired boiler. In this alternative, combustor 205 is similar to combustor 105 of FIG. 1 and the heat exchange zone is not used.

When combustor 205 is located upstream of membrane separation zone 207, the operation requires an optimum balance between the benefits of steam sweep and reduced oxygen recovery by the membrane due to combustion of a portion of the oxygen in membrane feed 59 to generate sweep steam 61. If a portion of steam 61 is introduced into the non-permeate 55 as water 67, a similar balance is required between increased power recovery in expansion turbine 211 and reduced oxygen recovery in membrane separation zone 207.

The feed gas to membrane separation zone 207 can be heated in an alternative manner in which combustor 205 is located downstream of the membrane separation zone (not shown) and combusts fuel with hot oxygen-containing non-permeate 65 in a manner similar to that of combustor 119 in FIG. 1 as earlier described. In this alternative manner, compressed feed 53 is heated completely in heat exchange zone 203 to yield hot compressed feed 59, and sweep steam 61 is generated as previously described. This alternative location of combustor 205 is preferred at higher rates of steam sweep, since the heat duty for production of sweep steam 61 can be provided readily by increased firing rate in combustor 205.

Hot membrane zone product stream 63, after cooling in heat exchange zone 221, yields cooled oxygen product 85 at a temperature above its dew point. This stream contains water vapor and can be used directly as a steam-oxygen mixture if desired, or can be cooled further (not shown) to condense the water present therein to obtain a high purity oxygen product.

Figure 3:
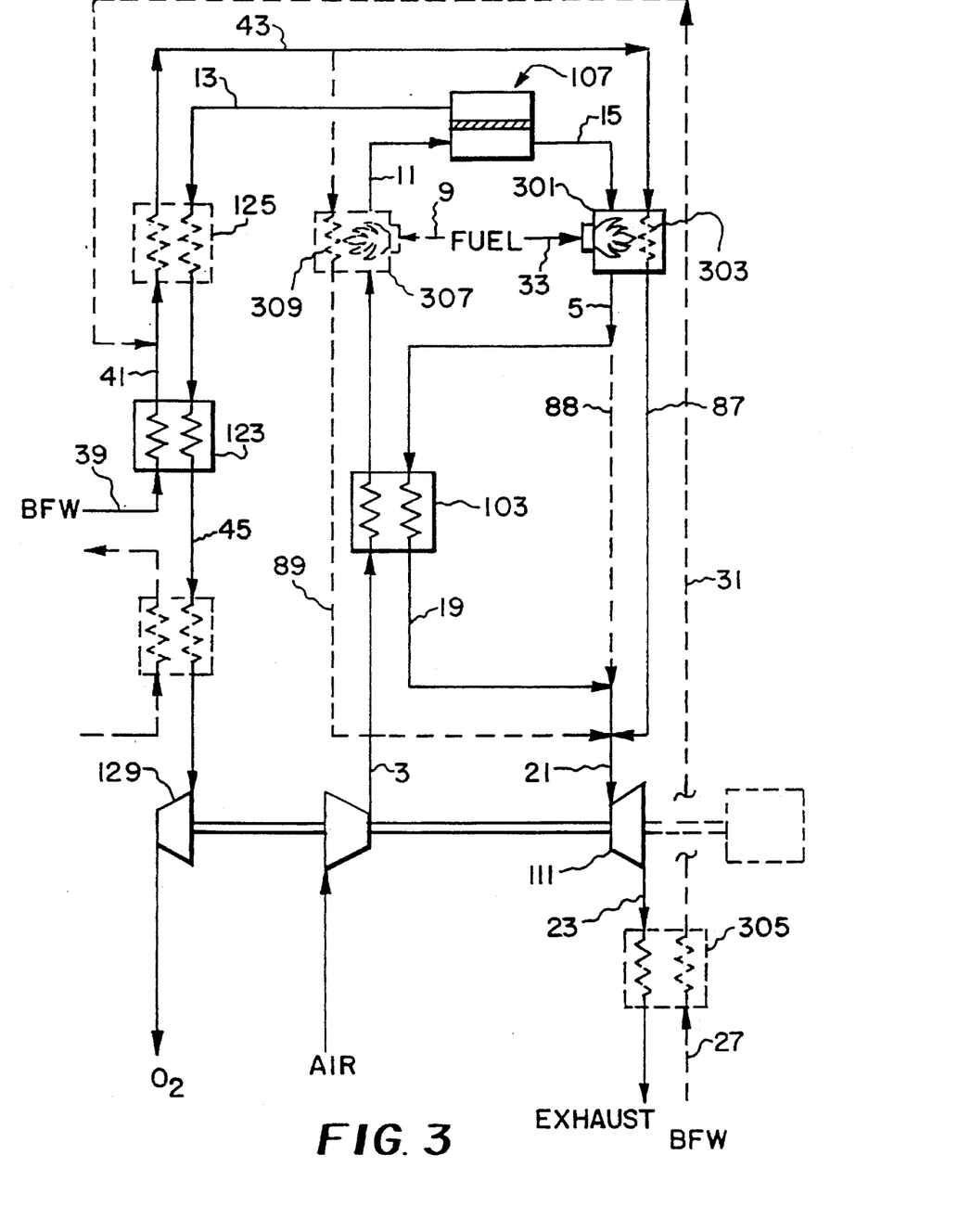
FIG. 3 is a schematic flowsheet of another alternative embodiment of the present invention.

An alternative embodiment of the invention is given in FIG. 3 which illustrates another method of heating water for introduction into the non-permeate stream prior to the expansion turbine. In this embodiment, preheated boiler feed water is further heated by indirect heat exchange with combustion products in combustor 301 or 307 which is either upstream or downstream respectively of the membrane separation zone. Combustor 301 or 307 is identical in operation to combustor 205 described earlier in reference to FIG. 2. In the preferred mode of the present embodiment of FIG. 3, compressed feed 3 is heated by indirect heat exchange with hot process stream 5 (defined later) in heat exchange zone 103 to yield heated feed 11 to membrane separation zone 107. Non-permeate 15 is combusted with fuel 33 in combustor 301, and heated non-permeate combustion product 5 transfers heat to compressed feed 3 in heat exchange zone 103. Preheated boiler feed water 43 is further heated in heat transfer zone 303 within combustor 301 to yield steam 87 which is combined with non-permeate stream 19 and introduced as stream 21 directly into expansion turbine 111. Alternatively, steam 87 can be introduced into hot non-permeate 5 prior to heat exchange zone 103. In another alternative method of introducing water into the non-permeate stream prior to expansion turbine 111, non-permeate 15 is combusted with fuel 33 in an alternative combustor which is not equipped with heat exchange zone 303. Instead, water 43 is introduced directly into this alternative combustor (not shown) which is designed such that water is vaporized by direct contact with hot combustion gases within the combustor, and a single discharge stream containing combustion products, residual non-permeate components, and steam is withdrawn from the combustor. This discharge stream passes directly through heat exchange zone 103 to heat compressed feed 3 and passes into expansion turbine 111.

Preheated water 43 is provided by heating boiler feed water 39 by indirect heat exchange with hot oxygen permeate 13 in heat exchange zone 123. Additional preheat optionally is provided by heating boiler feed water 27 against expansion turbine exhaust 23 in heat exchange zone 305, combining the preheated water 31 with preheated water 41, and further heating the combined water against hot oxygen permeate 13 in heat exchange zone 125.

This embodiment of the invention allows recovery of process heat from both the hot oxygen permeate and the expansion turbine exhaust, and in addition allows the introduction of additional heat by increasing the firing rate of combustor 301. This allows flexibility in the combined operation of membrane separation zone 107 and expansion turbine 111, since the mass flow and temperature of inlet stream 21 to expansion turbine 111 can be controlled independently of membrane separation zone 107 by controlling the mass flow rate and temperature of steam 87. Control of the mass flow and temperature of steam 87 is in turn controlled by regulating the firing rate of combustor 301 and the heat exchange area of heat exchange zone 303. Alternatively, a controlled portion 88 of heated non-permeate combustion product 5 bypasses heat exchange zone 103, whereby both the temperature and mass flow of turbine inlet stream 21 can be controlled independently of the operation of membrane separation zone 107.

In an alternative mode of this embodiment, compressed feed 3 is heated in direct fired combustor 307 using fuel 9, and heated feed 11 contains the products of combustion. Preheated boiler feed water 43 is further heated by combustion gases in heat exchange zone 309 located within combustor 307. The resulting steam 89 is combined with hot non-permeate 5 and passed directly into expansion turbine 111. In this embodiment, heat exchange zone 103 optionally is used and combustor 303 is not used.

Features of the embodiments described above with reference to FIGS. 1, 2, and 3 may be combined to utilize both steam sweep and the addition of water to the non-permeate stream prior to the expansion turbine. As pointed out earlier, water 67 in FIG. 2 can be preheated by one or more feed water preheat steps described in the embodiment of FIG. 1. In addition, water 67 in FIG. 2 can be supplied as a portion of sweep steam 61. In the embodiment of FIG. 3, a portion of steam 87 or 89 can be used in a superheated state to provide sweep (not shown) to membrane separation zone 107, in which case a condensate removal step (not shown) would be required prior to oxygen blower 129. Alternatively, steam-oxygen mixture 45 at a temperature above its dew point can be withdrawn as a final product.

EXAMPLE 1

A heat and material balance was carried out to illustrate the invention of FIG. 1. Air 1 is compressed in compressor 101, which is a four-stage intercooled compressor having an isentropic efficiency of 82% per stage. The compressor is driven by expansion turbine 111 which has an isentropic efficiency of 83%. In this operating mode, the inlet operating temperature of the turbine is limited to 1250° F. In this mode, heat exchange zones 103, 112, 125, and 127 are not used. Oxygen permeate 13 is cooled in heat exchange zone 123 against boiler feed water 39 to yield water 43 which provides water 17 which is vaporized in vaporization zone 109. Oxygen 45 is withdrawn at a pressure of 6.8 psia by vacuum blower 129 which delivers oxygen product 49 at 16.6 psia. The process is operated to yield 1.0 ton/day of oxygen 49 from an air feed 3 of 9.5 ton/day for an oxygen recovery of 45%. Membrane separation zone 107 is operated at 1562° F. (850° C.) and an inlet pressure of 214.7 psia. Electric generator 117 is driven by expansion turbine 111 to generate 15.5 kW of electric power. A stream summary for the heat and material balance is given in Table 1.

of membrane separation zone 207. Oxygen permeate-water mixture 63 which contains 50 vol % oxygen is cooled in heat exchange zone 221. The process is operated to produce 1.6 ton/day of the oxygen-water mixture, equivalent to 1.0 ton/day of contained oxygen, from an air feed 51 resulting in an oxygen recovery of 43%. Key operating parameters include a membrane separation zone 207 operating temperature of 1562° F. (850° C.) and a feed pressure of 254.7 psia. Electric generator 219 produces 13 kW of electric power. A stream summary for the heat and material balance of Example 2 is given in Table 2.

TABLE 1

Stream Summary for Example 1 (FIG. 1)

| Stream | Temp., deg F. | Press., psia | Composition (mole fraction) | | | | | | Flow Rate (lb/hr) | | | | | | |
|---|---|---|---|---|---|---|---|---|---|---|---|---|---|---|---|
| | | | $N_2$ | $O_2$ | Ar | $CO_2$ | $H_2O$ | $CH_4$ | $N_2$ | $O_2$ | Ar | $CO_2$ | $H_2O$ | $CH_4$ | Total |
| 1 | 70 | 14.7 | 0.780 | 0.210 | 0.010 | 0.000 | 0.000 | 0.000 | 598 | 184 | 10.4 | 0.4 | 0.0 | 0.0 | 793 |
| 3 | 226 | 214.7 | 0.780 | 0.210 | 0.010 | 0.000 | 0.000 | 0.000 | 598 | 184 | 10.4 | 0.4 | 0.0 | 0.0 | 793 |
| 9 | 70 | 214.7 | 0.000 | 0.000 | 0.000 | 0.000 | 0.000 | 1.000 | 0 | 0 | 0.0 | 0.0 | 0.0 | 13.7 | 13.7 |
| 11 | 1562 | 214.7 | 0.757 | 0.143 | 0.009 | 0.031 | 0.060 | 0.000 | 598 | 129 | 10.4 | 37.8 | 30.7 | 0.0 | 806 |
| 15 | 1562 | 214.7 | 0.834 | 0.056 | 0.010 | 0.034 | 0.066 | 0.000 | 598 | 46.0 | 10.4 | 37.8 | 30.7 | 0.0 | 723 |
| 17 | 388 | 214.7 | 0.000 | 0.000 | 0.000 | 0.000 | 1.000 | 0.000 | 0 | 0.0 | 0.0 | 0.0 | 58.8 | 0.0 | 58.8 |
| 21 | 1250 | 214.7 | 0.739 | 0.050 | 0.009 | 0.030 | 0.172 | 0.000 | 598 | 46.0 | 10.4 | 37.8 | 89.5 | 0.0 | 782 |
| 23 | 550 | 14.7 | 0.739 | 0.050 | 0.009 | 0.030 | 0.172 | 0.000 | 598 | 46.0 | 10.4 | 37.8 | 89.5 | 0.0 | 782 |
| 13 | 1562 | 6.8 | 0.000 | 1.000 | 0.000 | 0.000 | 0.000 | 0.000 | 0 | 83.3 | 0.0 | 0.0 | 0.0 | 0.0 | 83.3 |
| 48 | 95 | 6.8 | 0.000 | 1.000 | 0.000 | 0.000 | 0.000 | 0.000 | 0 | 83.3 | 0.0 | 0.0 | 0.0 | 0.0 | 83.3 |
| 49 | 95 | 16.6 | 0.000 | 1.000 | 0.000 | 0.000 | 0.000 | 0.000 | 0 | 83.3 | 0.0 | 0.0 | 0.0 | 0.0 | 83.3 |
| 39 | 70 | 14.7 | 0.000 | 0.000 | 0.000 | 0.000 | 1.000 | 0.000 | 0 | 0.0 | 0.0 | 0.0 | 58.8 | 0.0 | 58.8 |

EXAMPLE 2

A heat and material balance was carried out to illustrate the mode of the invention given in FIG. 2. Air 51 is compressed in compressor 201 which is a five-stage compressor with an intercooler following each of the first three

TABLE 2

Stream summary for Example 2 (FIG. 2)

| Stream | Temp., deg F. | Press., psia | Composition (mole fraction) | | | | | | Flow Rate (lb/hr) | | | | | | |
|---|---|---|---|---|---|---|---|---|---|---|---|---|---|---|---|
| | | | $N_2$ | $O_2$ | Ar | $CO_2$ | $H_2O$ | $CH_4$ | $N_2$ | $O_2$ | Ar | $CO_2$ | $H_2O$ | $CH_4$ | Total |
| 51 | 70 | 14.7 | 0.780 | 0.210 | 0.010 | 0.000 | 0.000 | 0.000 | 635 | 195 | 11.0 | 0.4 | 0.0 | 0.0 | 841 |
| 53 | 359 | 254.7 | 0.780 | 0.210 | 0.010 | 0.000 | 0.000 | 0.000 | 635 | 195 | 11.0 | 0.4 | 0.0 | 0.0 | 841 |
| 57 | 70 | 254.7 | 0.000 | 0.000 | 0.000 | 0.000 | 0.000 | 1.000 | 0 | 0 | 0.0 | 0.0 | 0.0 | 14.4 | 14.4 |
| 59 | 1562 | 254.7 | 0.757 | 0.144 | 0.009 | 0.030 | 0.060 | 0.000 | 635 | 138 | 11.0 | 39.8 | 32.3 | 0.0 | 856 |
| 65 | 1562 | 254.7 | 0.829 | 0.062 | 0.010 | 0.033 | 0.066 | 0.000 | 635 | 54 | 11.0 | 39.8 | 32.3 | 0.0 | 772 |
| 81 | 704 | 14.7 | 0.829 | 0.062 | 0.010 | 0.033 | 0.066 | 0.000 | 635 | 54 | 11.0 | 39.8 | 32.3 | 0.0 | 772 |
| 73 | 70 | 20 | 0.000 | 0.000 | 0.000 | 0.000 | 1.000 | 0.000 | 0.0 | 0.0 | 0.0 | 0.0 | 46.9 | 0.0 | 46.9 |
| 79 | 537 | 20 | 0.000 | 0.000 | 0.000 | 0.000 | 1.000 | 0.000 | 0.0 | 0.0 | 0.0 | 0.0 | 46.9 | 0.0 | 46.9 |
| 61 | 1562 | 20 | 0.000 | 0.000 | 0.000 | 0.000 | 1.000 | 0.000 | 0.0 | 0.0 | 0.0 | 0.0 | 46.9 | 0.0 | 46.9 |
| 63 | 1562 | 20 | 0.000 | 0.500 | 0.000 | 0.000 | 0.500 | 0.000 | 0.0 | 83.3 | 0.0 | 0.0 | 46.9 | 0.0 | 130 |
| 85 | 225 | 20 | 0.000 | 0.500 | 0.000 | 0.000 | 0.500 | 0.000 | 0.0 | 83.3 | 0.0 | 0.0 | 46.9 | 0.0 | 130 | stages and has an isentropic efficiency of 78% per stage. Compressor 201 is driven by expansion turbine 211. In this mode, heat exchange zones 203, 223, and 225 are not used and no water is introduced into non-permeate 65. Oxygen permeate-steam mixture 63 is cooled in heat exchange zone 221 against boiler feed water 73 to yield preheated water 79, which is heated further in heat exchange zone 220 to provide steam 61 at 1562° F. and 20 psia to sweep the permeate side The present invention thus provides a simple high temperature method to produce oxygen or an oxygen-steam mixture by means of an ion transport membrane separation system in which steam is used to increase the membrane performance and/or to improve process heat recovery at low capital cost. Sweeping the permeate side of the membrane zone with steam increases the overall oxygen partial pressure driving force, thereby increasing the oxygen permeation rate and oxygen production for a given membrane area. Alternatively, a lower membrane area is required for a given oxygen production rate. Conversely, the membrane feed pressure can be reduced which reduces capital cost for many process components. In addition, the use of steam sweep allows the option of direct production of steam-oxygen mixtures which can be used in processes to gasify heavy hydrocarbons and coal. The present invention can be readily integrated with such gasification processes.

The addition of internally-heated water to the non-permeate gas prior to the expansion turbine recovers thermal energy from the process, allows independent control of the expansion turbine inlet, and provides operating flexibility by controlling mass flow to the expansion turbine. The embodiments of the invention exhibit the additional feature that many of the heat exchange zones are essentially simple steam boilers; the use of high temperature gas-gas heat exchangers is minimized or is not required. Direct injection of water converts the heat contained in the process streams into recoverable pressure energy simply and at low capital cost, and this energy is readily recovered in a single low-cost expansion turbine. This turbine operates at lower temperatures than conventional gas turbines, which can reduce maintenance requirements.

The essential characteristics of the present invention are described completely in the foregoing disclosure. One skilled in the art can understand the invention and make various modifications thereto without departing from the basic spirit thereof, and without departing from the scope of the claims which follow.

We claim:

1. A method for the recovery of oxygen from an oxygen-containing gas which comprises:
   (a) compressing and heating a stream of oxygen-containing gas to yield a hot pressurized feed;
   (b) passing said hot pressurized feed into a membrane separation zone comprising one or more oxygen-selective ion transport membranes which divide said zone into a feed side and a permeate side, wherein said hot pressurized feed flows through said feed side and oxygen permeate gas is produced in said permeate side, and withdrawing from said zone a hot oxygen-depleted non-permeate gas from said feed side and a hot oxygen permeate product from said permeate side;
   (c) introducing water into said hot oxygen-depleted non-permeate gas; and (d) passing the resulting water-containing oxygen-depleted non-permeate gas through an expansion turbine to generate shaft power and withdrawing exhaust gas therefrom.

2. The method of claim 1 wherein said oxygen-containing gas is air.

3. The method of claim 1 wherein said oxygen permeate product is high purity oxygen containing at least 98 vol % oxygen.

4. The method of claim 1 wherein said water is a liquid, a vapor, or a mixture of liquid and vapor.

5. The method of claim 4 wherein at least a portion of said water is preheated by indirect heat exchange with said hot oxygen permeate product.

6. The method of claim 4 wherein at least a portion of said water is preheated by indirect heat exchange with said exhaust gas from said expansion turbine.

7. The method of claim 1 wherein said oxygen-containing gas is heated following compression by combusting said gas with a fuel in a direct-fired combustor to produce a hot, oxygen-containing combustion product which provides said hot pressurized feed.

8. The method of claim 7 wherein at least a portion of said water is heated by indirect heat exchange with said hot oxygen-containing combustion product within said direct-fired combustor.

9. The method of claim 1 wherein said oxygen-containing gas is heated following compression by indirect heat exchange with a hot combustion product which is obtained by combusting said hot oxygen-depleted non-permeate gas with a fuel in a direct-fired combustor.

10. The method of claim 9 wherein at least a portion of said water is heated by indirect heat exchange with said hot oxygen-containing combustion product within said direct-fired combustor.

11. The method of claim 9 wherein said water is injected into said hot combustion product prior to said indirect heat exchange.

12. The method of claim 1 wherein the shaft power of said expansion turbine is used at least in part to drive an electric power generator.

13. The method of claim 1 which further comprises sweeping said permeate side of said membrane separation zone with a sweep gas and withdrawing therefrom a mixture comprising said sweep gas and said hot oxygen permeate product, wherein said sweep gas comprises one or more gaseous components which do not react with oxygen at the operating conditions of said membrane separation zone.

14. The method of claim 13 wherein said sweep gas is steam.

15. A method for the recovery of oxygen from an oxygen-containing gas which comprises:
   (a) compressing and heating a stream of said oxygen-containing gas to yield a hot pressurized feed;
   (b) passing said hot pressurized feed into a membrane separation zone comprising one or more oxygen-selective ion transport membranes which divide said zone into a feed side and a permeate side, wherein said hot pressurized feed flows through said feed side and oxygen permeate gas is produced in said permeate side, and withdrawing from the feed side of said membrane separation zone a hot oxygen-depleted non-permeate gas;
   (c) sweeping said permeate side of said membrane separation zone with a sweep gas and withdrawing therefrom a mixture comprising said sweep gas and said hot oxygen permeate product, wherein said sweep gas comprises one or more gaseous components which do not react with oxygen at the operating conditions of said membrane separation zone; and
   (d) passing said hot oxygen-depleted non-permeate gas through an expansion turbine to generate shaft power and withdrawing exhaust gas therefrom.

16. The method of claim 15 wherein said sweep gas is steam and said mixture comprising sweep gas and hot oxygen permeate product is a mixture of steam and oxygen.

17. The method of claim 16 wherein said oxygen-containing gas is heated following compression by combusting said gas with a fuel in a direct-fired combustor to produce a hot, oxygen-containing combustion product which provides said hot pressurized feed.

18. The method of claim 17 wherein said steam is obtained by heating water by indirect heat exchange with said hot, oxygen-containing combustion product within said direct-fired combustor.

19. The method of claim 18 which further comprises preheating said water by indirect heat exchange with one or more process streams selected from the group consisting of said mixture comprising steam and oxygen after withdrawal from the membrane separation zone, said hot oxygen-depleted non-permeate gas, and the exhaust gas from said expansion turbine.

20. The method of claim 15 wherein said oxygen-containing gas is air.

21. The method of claim 15 which further comprises introducing water into said hot oxygen-depleted non-permeate gas prior to said expansion turbine.

22. The method of claim 15 wherein the shaft power of said expansion turbine is used at least in part to drive an electric power generator.

* * * * *